United States Patent [19]

Tilman

[11] Patent Number: 5,071,689
[45] Date of Patent: Dec. 10, 1991

[54] HINGED ZIPPER

[75] Inventor: Paul A. Tilman, New City, N.Y.

[73] Assignee: Zip-Pak Incorporated, Northbrook, Ill.

[21] Appl. No.: 461,652

[22] Filed: Jan. 8, 1990

[51] Int. Cl.[5] .............................................. B32B 9/00
[52] U.S. Cl. .................................... 428/121; 428/124; 428/192; 428/195; 383/32; 383/37; 383/63; 206/554; 270/32
[58] Field of Search ............................. 383/32, 37, 63; 206/554; 428/192, 195, 121, 124; 270/32

[56] References Cited
U.S. PATENT DOCUMENTS

| 4,624,365 | 11/1986 | Derdyk | 383/37 |
| 4,674,634 | 6/1987 | Wilson | 206/554 |
| 4,691,373 | 9/1987 | Ausnit | 383/63 |
| 4,824,497 | 4/1989 | Tilman | 156/66 |

Primary Examiner—Patrick J. Ryan
Attorney, Agent, or Firm—Hill, Van Santen, Steadman & Simpson

[57] ABSTRACT

An extruded plastic zipper structure comprising a continuous series of predetermined length zipper sections, and hinges connecting the zipper sections together so that the sections can be fan-folded upon one another.

20 Claims, 1 Drawing Sheet

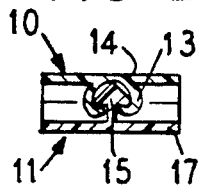
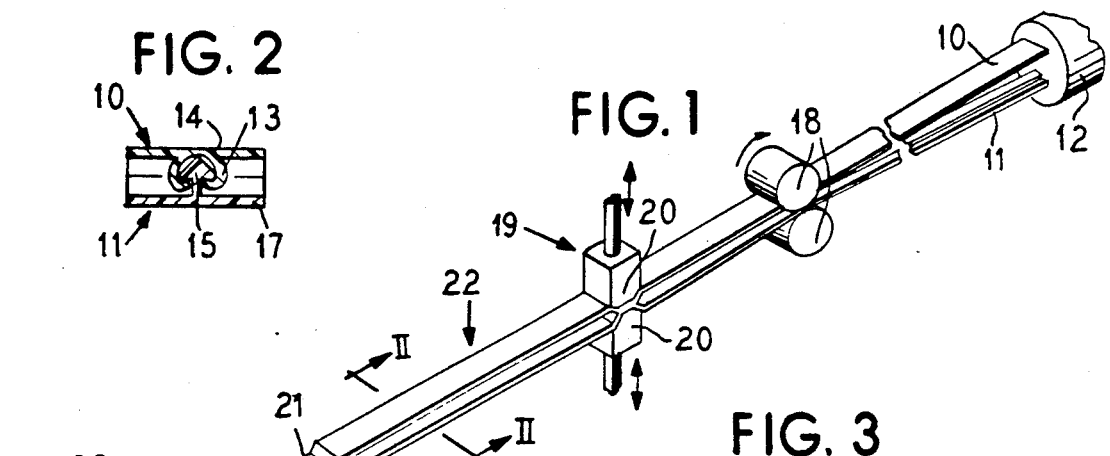
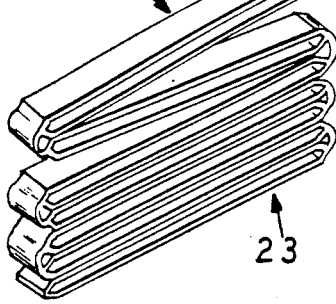
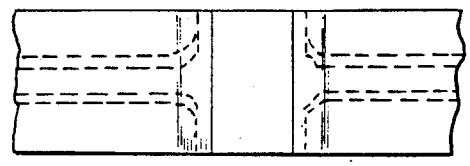
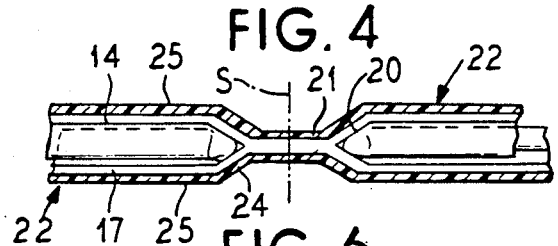
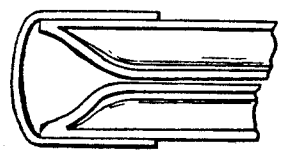
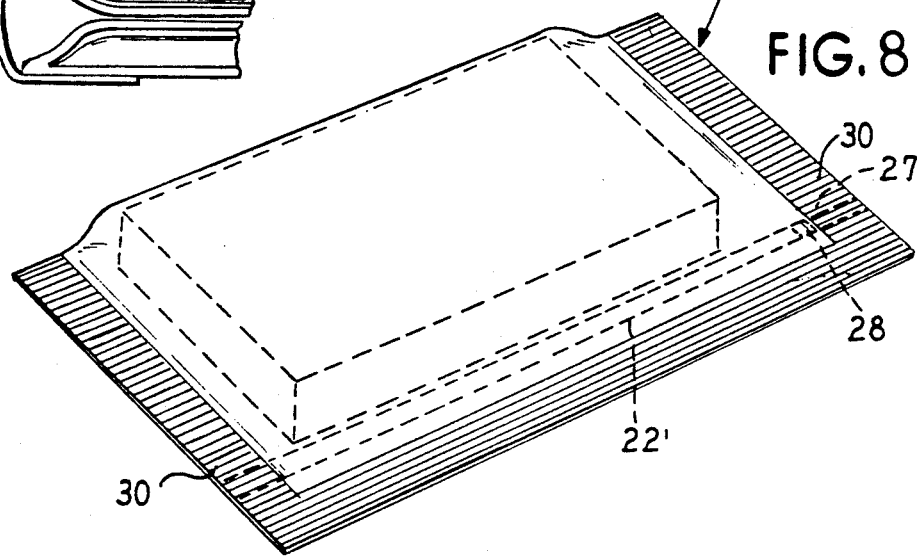

HINGED ZIPPER

BACKGROUND OF THE INVENTION

The present invention relates in general to the bag or package making art, and is more particularly concerned with a new and improved method of and means for providing extruded thermoplastic reclosable fastener means, commonly referred to as zippers, for bags or packages which may be formed from plastic film and provided with mouth ends closable by means of the zipper.

As heretofore generally provided, the zippers have either been extruded integrally with the bag making film, or the zippers may have been preformed in continuous strip and supplied in rolls for subsequent use in a bag making line. This is exemplified in recently issued U.S. Pat. No. 4,835,835.

An inherent disadvantage of the continuous rolling of thermoplastic zippers is the distortion that develops due to the memory of the winding system. This manifests itself as memory of the spool known as curvature and camber which causes deviation or warpage in the zipper strip from a straight line. It may be noted, however, that in the accepted mode of applying zipper to substrates in packaging machines, the zipper is kept under tension in order to minimize the difficulty in application of the otherwise warped zipper to the substrate. In cases where zero deviation from straightness is required, the zipper must be held under extreme tension. In applications where the zipper cannot be held under tension, application of the zipper to a substrate is virtually unattainable.

The provision of sectional lengths of zipper to be applied to the outside of bags is disclosed in U.S. Pat. No. 4,691,373. In that disclosure, pressure sensitive adhesive is provided on the predetermined length of zipper and a peelable protective strip is applied over the pressure sensitive adhesive until the sectional length of zipper is to be used. That disclosure does not meet the problem of supplying predetermined lengths of zipper in a ready availability mode for applying separate lengths of the zipper to bags in a bag production line, especially as conducted in a bag making machine.

SUMMARY OF THE PRESENT INVENTION

The present invention provides a new and improved method and means for solving the problems discussed hereinabove.

An important object of the present invention is to provide a continuous line supply of reclosable zipper capable of being applied in use without exhibiting curvature or camber.

Another object of the present invention is to provide a reclosable zipper, of the, character described, with hinge means connecting the adjacent ends of a continuous series of zipper sections.

Another object of the present invention is to provide a new and improved hinge structure for connecting sections of extruded plastic zipper, enabling the zipper sections to be neatly folded onto themselves in a storage and packaging mode.

A still another object of the present invention is to provide a reclosable zipper capable of being supplied in such a form that either in machine direction running or head running of the bag making film, application of the zipper sections to the bag making film can be effected substantially without reducing the line speed of the packing machine.

BRIEF DESCRIPTION OF THE DRAWINGS

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

FIG. 1 is a more or less schematic perspective view demonstrating a method of producing hinged zipper according to one preferred embodiment of the invention;

FIG. 2 is an enlarged sectional detailed view taken substantially along the line II—II in FIG. 1;

FIG. 3 is an enlarged fragmentary plan view of the hinge portion of the zipper strip of FIG. 1;

FIG. 4 is an edge elevational view of the zipper strip fragment shown in FIG. 3 and showing the zipper attached to bag/package film;

FIG. 5 is an enlarged fragmentary edge elevational view of the zipper strip of FIG. 1 showing one of the connecting hinge areas;

FIG. 6 is an edge elevational view similar to FIG. 4, but showing a modification in the hinge connecting endwise aligned zipper sections;

FIG. 7 is a view similar to FIG. 5, but showing the modification of FIG. 6 folded as permitted by the hinge structure; and FIG. 8 is a perspective view of a representative package utilizing zipper sections according to the form disclosed in FIGS. 6–7.

DETAILED DESCRIPTION

Referring to FIG. 1, complementary recloseable zipper strips 10 and 11 are extruded from any preferred thermoplastic material, well known in this art, by extrusion means including extruder apparatus 12 disclosed schematically. It will be understood that, as is usual, the extruder apparatus 12 will also include appropriate chilling means so that, promptly after issuing of the zipper strips from the extruder nozzle, they will be satisfactorily set to retain the desired cross-section. That cross-section, in the present instance, comprises a channel or groove shaped profile 13 substantially longitudinally centered on a base 14 of the zipper strip 10, and a complementary rib or arrow-shaped profile 15 substantially longitudinally centered on a base 17 of the zipper strip 11. Any other preferred profile shape may be used, if preferred. The arrangement is such that the profiles 13 and 15 are recloseably interlockable by pressing the strips 10 and 11 toward one another with the profiles aligned. Separation of the zipper is readily effected by pulling the strips apart.

As soon as the strips 10 and 11 are self-sustaining after the extrusion process, they are joined together by releasably interlocking the profiles 13 and 15. This may be effected by passing the aligned complementary strips between driving pinch rolls 18, rotatively complementarily driven in any well known manner. From the pinch rolls 18, the interlocked zipper assembly travels rectilinearly through hinge forming spot sealing means 19, schematically illustrated as comprising a pair of heated complementary cooperating sealing heads 20 which may be cyclically reciprocated toward one another in a sealing stroke, or one of the sealing heads 20 may serve as a stationary sealing anvil while the other cooperates in cyclically reciprocating manner for effecting the desired sealing function. In any event, in each sealing cycle the sealing means 19 seals a combination end seal and hinge 21 connecting the adjacent ends of the straight zipper assembly sections 22. As will be observed, the hinge area 21 in each instance is desirably of a sufficient thinness and extent or length between the adjacent ends of the connected zipper sections 22 to permit ready folding of the zipper sections 22 one upon another in a generally fan fold manner to provide a stack 23 of any desired height for bundling or packaging and convenience for storage or shipment and subsequent use seriatim in a bag or package making machine. It will be understood, of course, that each of the zipper assembly sections 22 may be as long as desired and that the hinge areas 21 may be as long as desired. While in a preferred construction, the hinge areas 21 are, as best seen in FIG. 4, located in a plane about midway the thickness of the zipper sections 22, if desired, the planar placement may be varied either up or down relative to the placement shown in FIG. 4, depending on preferences at the point of use.

At each end of each of the connecting hinge areas 21 there is desirably an end seal convergence connection 24 transition from the total thickness of the associated zipper section 22 for neat accomodation of the mass of zipper profile material displaced in the heat sealing process involved in fashioning the hinges.

In use of the hingedly connected zipper sections 22, a continuous integral hinge connected series of the sections may be, as demonstrated in FIG. 4, joined in a bag or package making machine with bag/package making film 25 which may be fusibly compatible with the plastic material of the zipper and may therefore be joined in heat seal manner to the base webs 14 and 17 as well as the hinge and end seal areas, 21 and 24, of the zipper. If fusibly incompatible, joinder of the hinge sections 22 and film 25 may be effected adhesively, which is also a well known expedient. The assembly thus formed may then be separated into individual bags or packages by separating the assembly along severance line S at the hinges 21.

In another arrangement as depicted in FIGS. 6 and 7, zipper means having the same general attributes of the zipper structure as in FIGS. 1-5, and which may be similarly extruded from a desirable thermoplastic material is precut into separated desired length straight sections 22' and the sections hingedly connected seriatim by thin hinge pieces 27 secured as by heat sealing where that is feasible or by adhesive means to the adjacent ends of the zipper sections. For example, as shown, each of the zipper sections 22' has its opposite ends provided with respective end seals 28, merging into the base webs 14' thereof, and the hinge piece 27 bonded to the base webs 14'. FIG. 7 shows how the hinge pieces 27 enable the zipper sections 22' to be readily fan-folded upon themselves in similar manner as depicted in connection with the integrally hingedly connected form of the invention shown in FIGS. 1 and 5.

An important advantage of the arrangement of FIGS. 6 and 7 is that the spacing or gapping between the cut length zipper sections 22' can be readily determined during the extrusion/fabrication process. This permits the bag or package manufacturing operation freedom of choice in using any selected zipper section length suitable for the particular package.

In a normal packaging operation, a continuous length of zipper is required throughout the width of the package as is generally demonstrated in connection with FIG. 4, whereas in many cases this is not necessary nor required. For example, as shown in the package 29 of FIG. 8, only the actual length of zipper section Z can be predetermined to fit between side seals 30 of the package, without requiring any projection of end seals 28 into the package side seals. Further, although terminal portions of the hinge piece 27 may project into the side seals 30 of the package, because those terminal portions are quite thin, no special sealing effort will be required at the points where the hinge member terminal portions extend into the side seals 30. The material of the hinge pieces 27 is far less expensive than the section modulus material of the zipper sections, so that by avoiding need for zipper section modulus in the hinge area a substantial cost saving is effected where the zipper arrangement of FIGS. 6 and 7 can be used as compared to the arrangement of FIGS. 1-5.

From the foregoing, it will be apparent that the new and improved straight zipper section technique of the zipper according to the present invention is thoroughly compatible with productivity of bag making or packaging lines and is not detrimentally affected by the heretofore generally accepted difficulties of supplying zipper which must be placed under tension for applying the same to the packages or bags since the zipper. The zipper sections of the present invention are from the beginning free from curvature or camber. The hinged zipper section arrangement is readily adaptable to either machine direction or head-to-head bag or packages making applications without reducing the line speed of the packaging or package making machine.

It will be understood that variations and modifications may be effected without departing from the spirit and scope of the novel concepts of the present invention.

I claim as my invention:

1. An extruded plastic zipper structure, comprising:
    a continuous series of predetermined length zipper sections; and
    individual hinges substantially shorter than said zipper sections connecting the adjacent ends of said zipper sections together into a series so that the sections can be fan-folded upon one another.

2. A zipper structure according to claim 1, wherein said hinges are integral in one piece with the ends of the zipper sections arranged in end-to-end relation.

3. A zipper structure according to claim 2, wherein said integral hinges comprise flattened heat seals between the ends of the zipper sections.

4. A zipper structure according to claim 3, wherein the zipper section ends have heat seal end closures joined to said hinges.

5. A zipper structure according to claim 1, wherein a substantial plurality of zipper sections are fan-folded into a stack of zipper sections.

6. A zipper structure according to claim 1, wherein said hinges connecting said zipper sections comprise separate hinge pieces hingedly connecting spaced apart ends of the zipper sections.

7. A zipper structure according to claim 6, wherein said zipper sections have flat base areas, and said hinge pieces are secured to said base areas.

8. A zipper structure according to claim 6, wherein the ends of the zipper sections have end seals merging toward said hinge pieces.

9. A zipper structure according to claim 1, wherein said hinge web material comprises a thermoplastic fusibly compatible with the thermoplastic material of the zipper sections and fusibly secured thereto.

10. A zipper structure according to claim 1, in combination with bag/package making film and wherein said hinges are secured to said film.

11. A method of making zipper structure, comprising: extruding a plastic zipper structure;

and forming individual hinges substantially shorter than said sections between and connecting a continuous series of predetermined length sections of the zipper structure so that they can be fan-folded upon one another.

12. A method according to claim 11, which comprises forming said hinges integral in one piece with the ends of the zipper sections arranged in end-to-end relation.

13. A method according to claim 12, which comprises forming said hinges by flattened heat sealing between the ends of the zipper sections.

14. A method according to claim 11, which comprises forming the zipper section ends with heat seal end seals and joining such end seals to said hinges.

15. A method according to claim 11, which comprises fan-folding a substantial plurality of the zipper sections into a stack of zipper sections.

16. A method according to claim 11, which comprises forming said hinges as separate hinge pieces and connecting spaced apart ends of the zipper sections with said pieces.

17. A method according to claim 16, which comprises forming said zipper sections with flat base areas, and securing said hinge pieces to said base areas.

18. A method according to claim 16, which comprises forming the ends of the zipper sections with end seals and merging the end seals toward said hinge pieces.

19. A method according to claim 11, which comprises forming said hinges from pieces of thermoplastic material fusibly compatible with the thermoplastic material of the zipper sections and fusibly securing said pieces to ends of said zipper sections.

20. A method according to claim 11, which comprises combining the zipper structure with bag/package making film and securing said hinges to said film.

* * * * *